(12) United States Patent
Sardina et al.

(10) Patent No.: US 9,779,127 B2
(45) Date of Patent: Oct. 3, 2017

(54) INTEGRATING DATABASE MANAGEMENT SYSTEM AND EXTERNAL CACHE

(71) Applicant: Wal-Mart Stores, Inc., Bentonville, AR (US)

(72) Inventors: Jason Sardina, Carlsbad, CA (US); Alexei Olkhovskii, Carlsbad, CA (US); Robert P. Lowell, San Marcos, CA (US); Michael Machado, Sacramento, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 560 days.

(21) Appl. No.: 14/231,495

(22) Filed: Mar. 31, 2014

(65) Prior Publication Data
US 2015/0278282 A1 Oct. 1, 2015

(51) Int. Cl.
*G06F 17/30* (2006.01)

(52) U.S. Cl.
CPC .... *G06F 17/30362* (2013.01); *G06F 17/3048* (2013.01)

(58) Field of Classification Search
CPC .................................................. G06F 17/3048
See application file for complete search history.

(56) References Cited

U.S. PATENT DOCUMENTS

| | | | | |
|---|---|---|---|---|
| 2009/0254556 A1* | 10/2009 | Guo | .......... | G06F 17/30356 |
| 2010/0185597 A1* | 7/2010 | Dunn | .......... | G06F 17/30377 |
| | | | | 707/704 |
| 2012/0297237 A1* | 11/2012 | Chatterjee | .......... | G06F 17/30566 |
| | | | | 714/4.1 |
| 2012/0303911 A1* | 11/2012 | Perrin | .......... | G06F 7/00 |
| | | | | 711/159 |
| 2014/0108421 A1* | 4/2014 | Isaacson | .......... | G06F 17/30575 |
| | | | | 707/747 |
| 2014/0258255 A1* | 9/2014 | Merriman | .......... | G06F 17/30362 |
| | | | | 707/704 |
| 2014/0310391 A1* | 10/2014 | Sorenson, III | .......... | H04L 45/24 |
| | | | | 709/223 |

OTHER PUBLICATIONS

MC Brown, Developing with Couchbase Server, Jan. 31, 2013, O'Reilly Media, First Edition, 1-87.*

* cited by examiner

*Primary Examiner* — Mohammad S Rostami

(74) *Attorney, Agent, or Firm* — Bryan Cave LLP

(57) ABSTRACT

Example systems and methods for integrating a primary data store (e.g., a source-of-truth relational database management system) and a secondary data store (e.g., external cache) are described. The approach implements a modified read-through/write-through data access pattern that integrates read and write flows in order to support high-concurrency environments while maintaining immediate consistency between stores. Writes are handled using a three-phase flow that avoids concurrency-related race conditions and the need to block in the secondary store in order to maintain cross-store consistency. Reads are never dirty and will repair the secondary store as needed without conflicting with repairs that may have been initiated by other sessions.

14 Claims, 10 Drawing Sheets

INTEGRATING DATABASE MANAGEMENT SYSTEM AND EXTERNAL CACHE

TECHNICAL FIELD

The present disclosure relates to methods and systems for integrating a database management system and an external cache.

BACKGROUND

Service-oriented architecture (SOA) is a software design and/or software architecture design pattern based on distinct pieces of software providing application functionalities as services to service consumers. Some SOA designs impose tight latency requirements on database calls that cannot be met through reliance on direct database queries. Choosing to implement an object cache helps to address read/write latency concerns while protecting scarce database resources. However, keeping cache and database persistence in sync without causing excessive overhead is a complex process that may be cumbersome to maintain.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
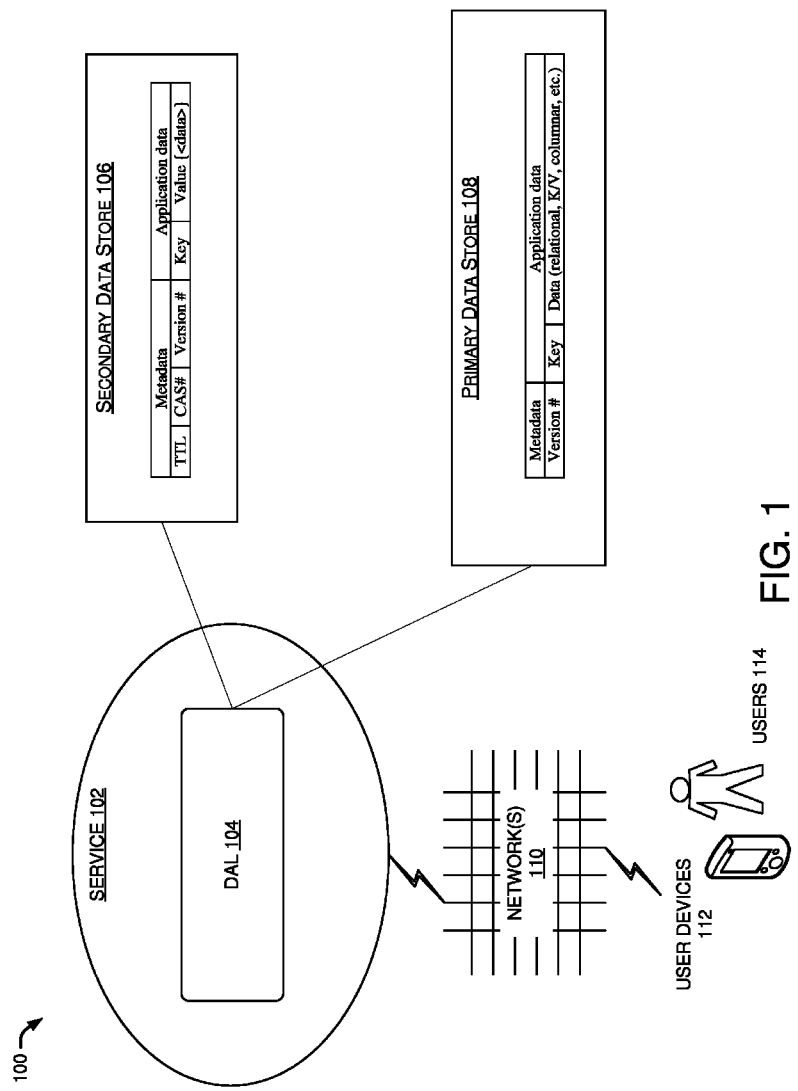
FIG. 1 is a block diagram depicting a computing environment within which an example embodiment of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Embodiments of the present disclosure relate to persistence pattern that enables immediately consistent reads across a primary source-of-truth data store (e.g., a source-of-truth database) and one or more secondary data stores (e.g., independent external cache). In some embodiments, the pattern may provide for high concurrency with guarantees that secondary data store consistency never requires blocking within the secondary data store, and reconciliation flows to ensure that transactions may continue against the primary data store while the secondary data store is unavailable.

Embodiments of the present disclosure may keep a primary data store immediately consistent with a secondary data store. A primary use case for this integration pattern may protect a primary/source-of-truth data store from excess workload by offloading read-activity to a horizontally scalable and immediately consistent secondary data store (e.g., a caching tier, search index tier, etc.). For example, embodiments of the present disclosure may provide the following guarantees (e.g., under normal exception-free conditions). The primary data store may be the source-of-truth for all persisted data. The secondary data store may be accessed first by readers in order to offload work from the primary to an ideally more scalable secondary data store. The primary and secondary data stores may be kept immediately consistent. Dirty reads from secondary data store may not be possible. Stale reads may only result from exception scenarios and may be reconciled through both synchronous and asynchronous flows. Stale writes to the primary data store may not succeed. The primary and secondary data stores may not communicate directly; data persistence may be managed through application driven workflows. Consistency of primary/secondary data stores may be maintained across three data access operations: puts, gets and deletes, which are discussed further below.

In these instances, readers may see current/valid data, reading from secondary storage as a first choice, while accessing the primary storage when required. Readers may repair the secondary storage when it lacks requested data. Writers may not block within the secondary data store, ensuring that the secondary store does not become a concurrency bottleneck. Writers may not fail when secondary data store is unavailable. The primary data store may be required to be available for transaction success. Applications may be stateless across calls, and the persistent pattern may not require prior application state to execute read and write flows.

While immediate consistency between data stores is enforced during standard operation, transactions against the primary store may continue if the secondary store is unavailable. Therefore, the continuation may leave the secondary data store to be repaired through subsequent online and offline reconciliation flows. Accordingly, the secondary store may be eventually consistent for a subset of data.

Embodiments of the present disclosure relate to read-through/write-through persistence patterns and/or refresh-ahead and write-behind patterns. These patterns may be used to integrate source-of-truth data with one or more temporary caches. Embodiments of the present disclosure address a different set of problems associated with these patterns and provide immediate consistency between primary and secondary data stores (e.g., source-of-truth and cache).

Compared to conventional read-through/write-through cache patterns, embodiments of the present disclosure has advantages. For example, read and write flows may be integrated and designed specifically to handle high-concurrency environments. The read flow, for example, may be aware of write operations that are in the process of repairing cache.

In some instances, distributed data stores add the challenge associated with, for example, coordinating two atomic transactions, handling concurrent read/write operations as well as recovering from failure at any point during the write flow. With respect to conventional techniques, many implementations of write-through patterns deal with hardware-level consistency in which concurrency may not be a concern. Because both writes are local to the hardware in question, both writes essentially succeed or fail as a unit. Embodiments of the present disclosure directly addresses the challenge of supporting concurrent atomic transactions across distributed data stores. Embodiments of the present disclosure may avoid concurrency race conditions while implementing "breakable pins" to avoid the need to serialize (block) in the secondary data store.

FIG. 1 is a block diagram depicting a computing environment 100 within which an example embodiment of the present disclosure may be implemented. Computing environment 100 includes an application service 102, which may include a set of related hardware and/or software of which functionalities may be reused for different purposes, together with the policies that control its usage. Service 102 may include a data access logic (DAL) 104. DAL 104 may enable application services 102 to persist data while abstracting the details of the persistence process. DAL 104 may be implemented as a layer of an application and/or application services, which provides simplified access to data stored in persistent storage (e.g., relational databases). In some embodiments, DAL 104 may be a code library that implements the primary flows for the pattern presented in this paper. For example, DAL 104 may be consumed by an application to coordinate operations (e.g., create, read, update, delete).

DAL 104 may manage the complexity of secondary data store management to enable service developers to focus on business logic and not persistence logic. For example, DAL 104 may implement an object-level cache via interfaces with cache as a service. DAL 104 may also manage cache persistence as part of a persistence chain that includes writes to cache, the database and other persistence such as, for example, global indexes for sharded data domains. DAL 104 may also support caching for a variety of database implementations (e.g., standalone Oracle, sharded Oracle, etc.).

In some embodiments, DAL 104 may manage cache persistence associated with a primary data store 108 and a secondary data store 106. Secondary data store 106 may be a key/value data store that may be kept immediately consistent with the primary under normal conditions. For example, second data store 110 may be an external cache, which may be an external cache physically separate from primary data store 108. A common secondary data store may include highly scalable NoSQL key/value stores or key-based text search stores (e.g., Apache Couchbase).

Secondary data store 106 may offload read activity from primary data store 108. Secondary data store 106 may support the following functionalities, for example, atomic write of a single serialized object (e.g., a JSON document), efficient key-based access, time-to-live (TTL) data expiration functionality, optimistic locking, update and Insert-only (add) methods, etc. Second data store 110 may store metadata, which further include a TTL, a Check and Set (CAS) number, and a version number.

The TTL refers to a metadata attribute provided by certain data stores that set an expiration time for a given record or set of records. Upon expiration, the record(s) may be removed from the data store automatically. Optimistic locking enables a data store to prevent writes of stale data by associating a unique version number to the data in question. Specifically, data updates succeed when the updating process's version number matches that of the currently persisted data, and the newly persisted data has been modified to reflect a new version number. Common optimistic locking methods may include application-managed optimistic locking and CAS optimistic locking. With respect to the optimistic locking, the application may retain the current state of an object's version number (i.e., "active version") during a transaction, generating a new version number (e.g., per transaction), and update the data store only when the persisted version number matches the active version number.

With respect to CAS optimistic locking, CAS functionality may be provided by the data store such that an application is able to retrieve data with a CAS version (i.e., "CAS get") and update data based upon the CAS version (i.e., "CAS put"). CAS may differ from application-managed optimistic locking in that CAS version numbers are often unknown to the application after CAS put.

Service 102 may be connected to one or more network(s) 110 to exchange information with multiple user devices 112 associated with multiple users 114. Network(s) 110 may include wired and/or wireless networks that enable communications between the various computing devices described in environment 100. In some embodiments, network(s) 110 may include local area networks (LANs), wide area networks (WAN), mobile telephone networks (MTNs), and other types of networks, possibly used in conjunction with one another, to facilitate communication between the various computing devices (e.g., user devices 112, servers associated with DAL 104, etc.). User devices 112 may be a mobile or desktop computer, a personal data assistant (PDA), an internet appliance, an internet enabled mobile phone, a server or any other computing device configured with a network connection.

Figure 2:
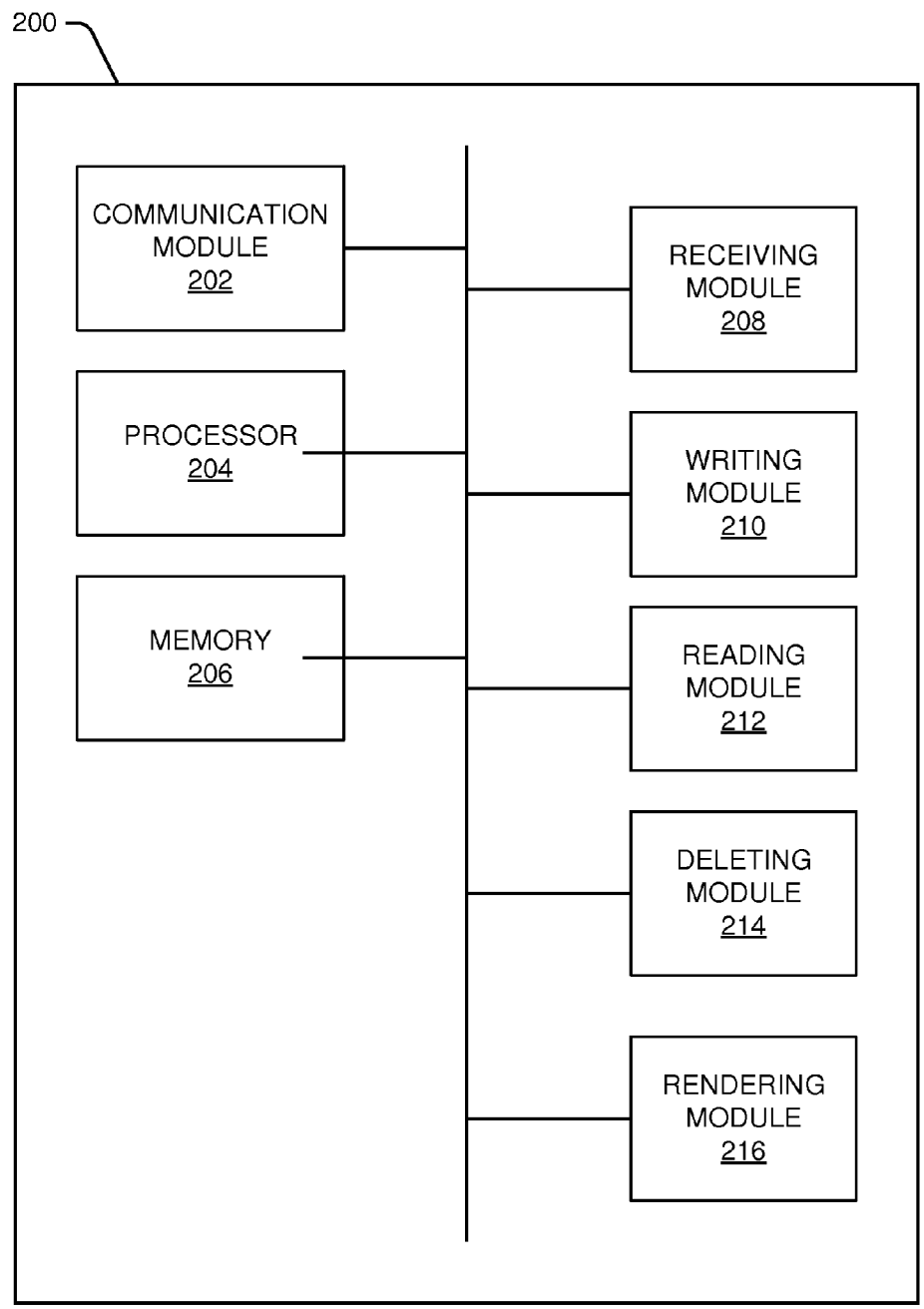
FIG. 2 is a block diagram depicting an embodiment of a computing device configured to implement systems and methods of the present disclosure.

FIG. 2 is a block diagram depicting an embodiment of a computing device 200 configured to implement systems and methods of the present disclosure. Computing device 200 (e.g., server 106) performs various functions related to integrating a database management system and an external cache, as discussed herein. In some embodiments, computing devices 200 may include ones of computing devices that cooperatively implement the functions described herein. Computing device 200 may include a communication module 202, a processor 204, and a memory 206. Communication module 202 allows computing device 200 to communicate with other systems, such as communication networks, other servers, etc. Processor 204 executes one or more sets of instructions to implement the functionality provided by computing device 200. Memory 206 stores these instructions as well as other data used by processor 204 and other modules contained in computing device 200.

Computing device 200 may also include a receiving module 208 configured to receive a request for certain operations of an object in secondary data store 106 and/or primary data store 108. Database operations may include various operations on the database (e.g., read: retrieval, write: insert or update, delete). For example, a database read operation may include reading an item from a database (e.g., primary data store 108) into a program variable. A database write operation may include writing the values of a program variable into an item in the database (e.g., primary data store 108) or its metadata into the database. A secondary data store 106 read operation may include reading an item from, for example, an external cache into a program variable. A secondary data store 106 write operation may include writing the values of a program variable into an item or its metadata into, for example, an external cache.

Computing device 200 may also include a writing module 210 configured to perform a put operation of an object. For example, during the put operation, writing module 210 may write or update content data of the object in secondary data store 106. In some embodiments, writing module 212 may determine whether secondary data store 106 includes the object. In response to a determination that secondary data store 106 includes the object, writing module 212 may set an optimistic locking value associated with the object. Writing module 210 may also update the object in primary data store 108 with an optimistic locking value. Writing module 210 may also update content data of the object in secondary data store 106 in response to a determination that the optimistic locking value has not been changed.

Optimistic locking enables a data store to prevent writes of stale data by associating a unique version number to the data in question. Specifically, data updates succeed when (1) the updating process's version number matches that of the currently persisted data, and (2) the newly persisted data has been successfully modified to reflect a new version number. For example, a cache optimistic locking value may represent a unique identifier generated for an individual object to manage optimistic locking in the secondary data store 106. A database locking optimistic value may represent a unique identifier generated for an individual object to manage optimistic locking at primary data store 108.

In some embodiments, writing module 210 may update the content data of the object in secondary data store 106 in response to a determination that secondary data store 106 does not include the object.

In some embodiments, the writing module 210 may set a check and set (CAS) value for the object and set a time-to-live (TTL) value for the object if its CAS value has not changed since the object was read from the secondary store. In some instances, writing module 210 may proceed to store the object in the primary data store 108 in response to a determination that the CAS value has not been changed.

In some embodiments, writing module 210 may set a database optimistic locking value associated with the object in response to a determination that the database optimistic locking value has not been changed.

Subsequently, the writing module 210 may determine whether the secondary data store's CAS value has not been change during the TTL. In some instances, writing module 212 may update the content data of the object in secondary data store 106 in response to the determination that the CAS value has not been change during the TTL.

Computing device may also include a reading module 212 configured to perform a get operation of an object. For example, during the get operation, reading module 210 may retrieve content data of the object in secondary data store 106. In some embodiments, reading module 212 may determine whether secondary data store 106 includes the object. In response to a determination that secondary data store 106 does not include the object, reading module 212 may retrieve content data of the object from the primary data store 108. Reading module 212 may also write the content data of the object to secondary data store 106, and return the content data of the object. In response to a determination that secondary data store 106 includes the object, reading module 212 may return content data of the object directly.

Computing device 200 may also include a deleting module 214 configured to perform a delete operation of an object. During the delete operation, the deleting module 210 may invalidate the object within the secondary data store 106 and set its TTL. The delete may also delete the object from the primary data store 108 and return success without revisiting the object in the secondary data store 106 (i.e., the object in the secondary data store is left to expire based on its TTL).

Computing device 200 may also include a rendering module 216 configured to provide a result and/or a report in response to the request received by service 102.

Figure 3:
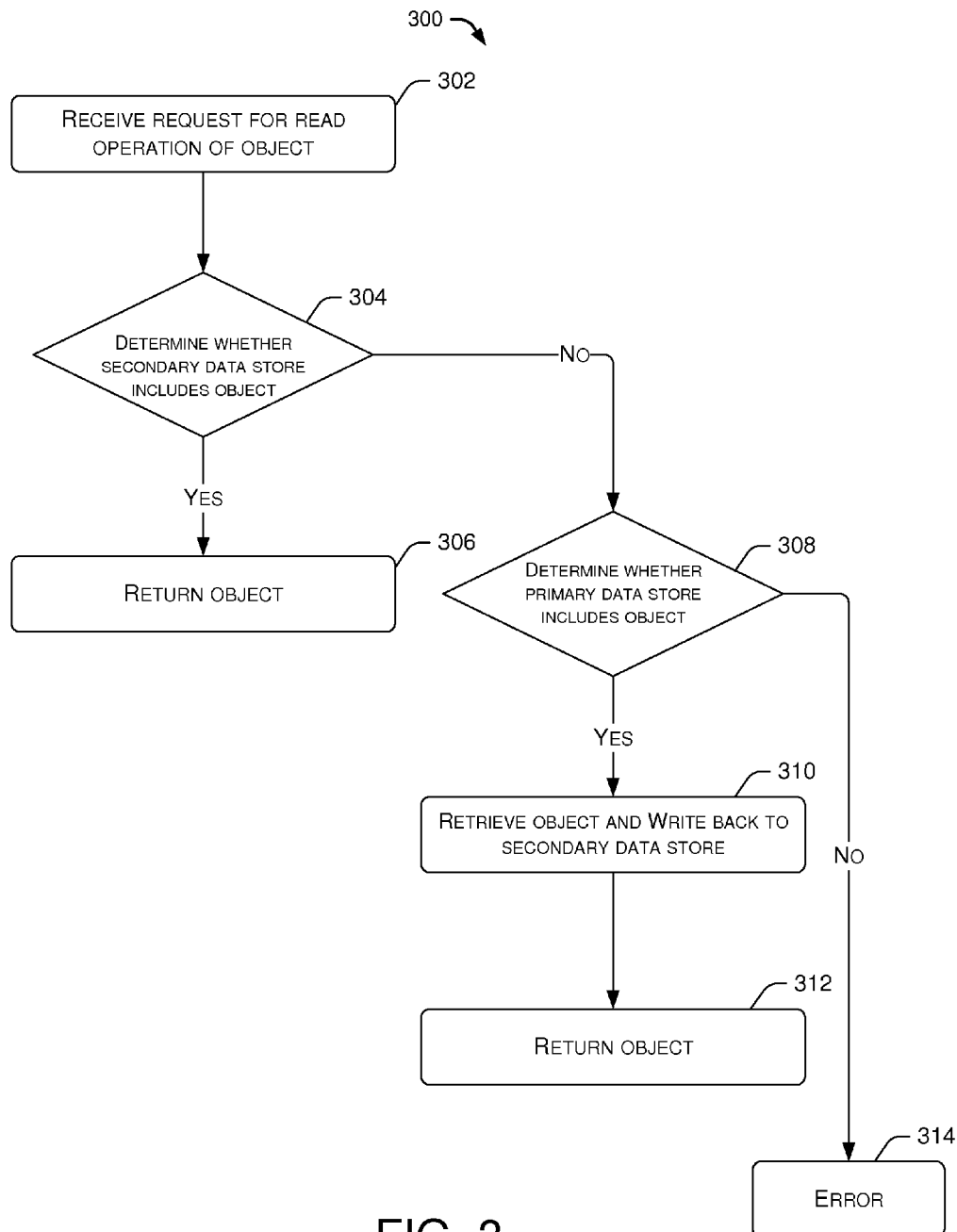
FIG. 3 is a flowchart diagram of an embodiment of a process for a get operation.

FIG. 3 is a flowchart diagram of an embodiment of a process for a get operation. Example process 300 includes one or more operations, actions, or functions. Although illustrated as discrete blocks, various blocks may be divided into additional blocks, combined into fewer blocks, or eliminated, depending on the desired implementation. Process 300 may be implemented by one or more processors including, for example, the computing device 200. For illustrative purposes, the operations described below are performed by one or more processors of one or more server(s) 106 of service 102 as shown in FIG. 1 and/or the processor 204 of the computing device 200 as shown in FIG. 2.

At 302, one or more processors of one or more servers of service 102 may receive request for performing an object read operation which is passed through to DAL 104.

At 304, DAL 104 may determine whether secondary data store 106 includes the object.

At 306, DAL 104 may return the object in response to a determination that secondary data store 106 includes the object.

At 308, DAL 104 may determine whether primary data store 108 includes the object in response to a determination that secondary data store 106 does not include the object.

At 310, DAL 104 may retrieve the object from primary data store 108 and write back the object to secondary data store 106 in response to a determination that secondary data store 106 does not include the object.

At 312, DAL 104 may return content data of the object directly to the calling service 102.

At 314, DAL 104 may return one or more "error" messages to the calling service 102 in response to a determination that the database does not include the object.

Figure 4:
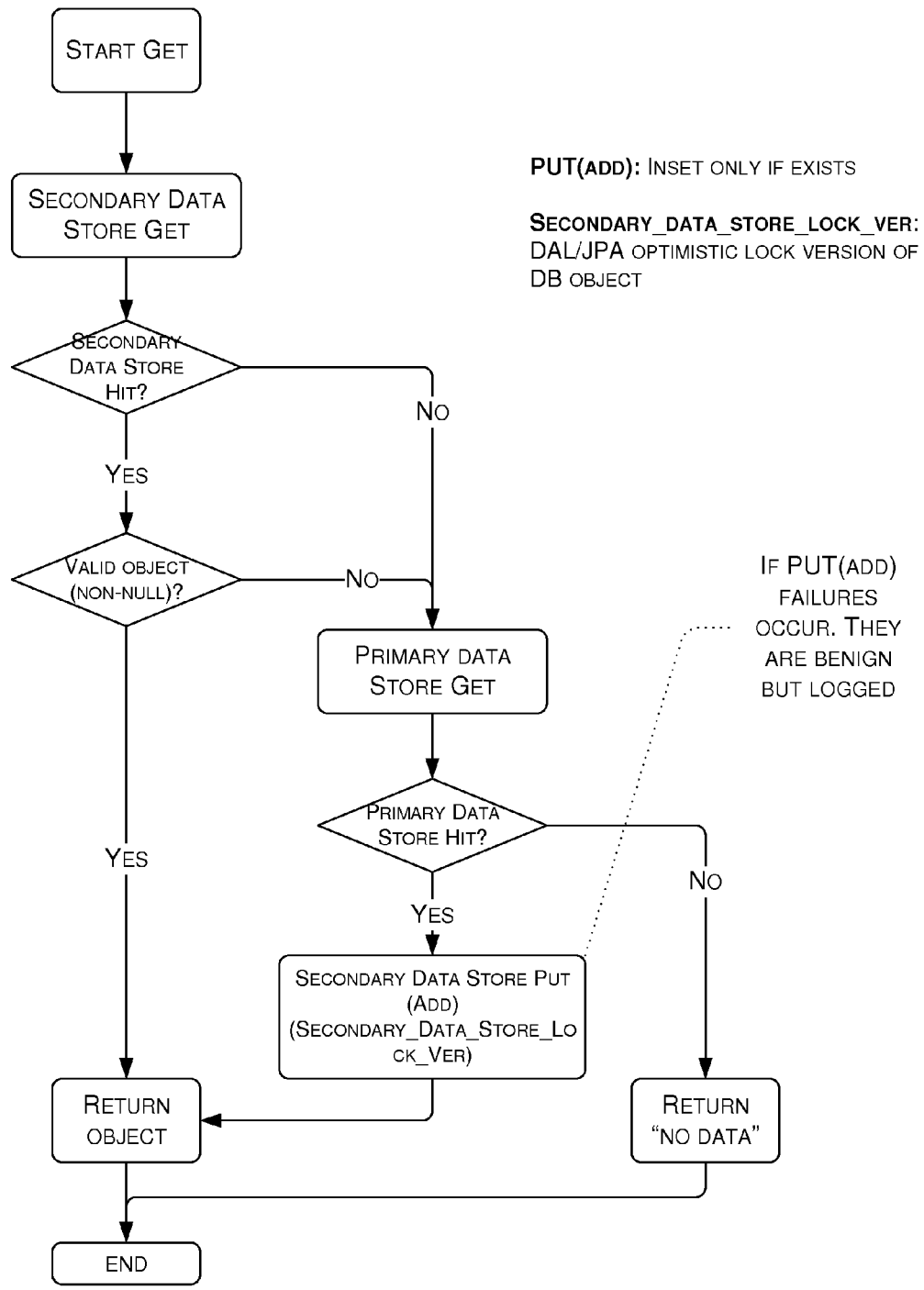
FIG. 4 is a flowchart diagram of an implementation of the embodiment of FIG. 3.

FIG. 4 is a flowchart diagram of an implementation of the embodiment of FIG. 3. As illustrated in FIG. 4, secondary data store 106 is first searched using a PK associated with the object. If the object is found and valid (e.g., the object payload is non-null), then the object may be returned. If the object is not found or a null payload is returned, primary data store 108 may then be searched using the PK. If the object is returned, the object may be written back to secondary data store 106 only if secondary data store 106 is still empty for the object (e.g., an add( )-based read-repair). If the object is not returned, an "error" massage (e.g., "no data found") may be returned to the user.

Figure 5:
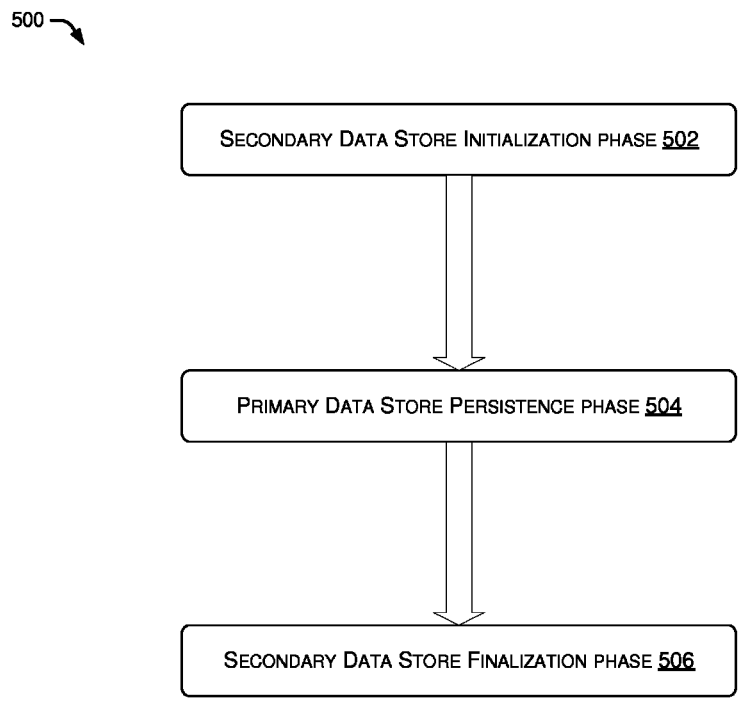
FIG. 5 is a flowchart diagram of a scheme for a put operation.

FIG. 5 is a flowchart diagram of a scheme for a put operation. To keep the primary data store 108 and secondary data store 106 in sync, a put operation may be implemented by DAL 104. The put operation may include three phrases: a second data store initiation phase 502, a primary data store persistence phase 504, and a secondary data store finalization phase 506.

Second data store initiation phase 502 may be related to setting metadata in the secondary store 110. Primary data store persistence phase 504 may be related to writing/committing application data to primary data store 108. Secondary data store finalization phase 506 may be related to resetting relevant metadata and persists application data to the secondary store During secondary data store initiation phase 502, an application may reserve a record in secondary data store 106 by marking it with an intention to modify (i.e., pinning). The marking may change the metadata associated with a record in secondary data store 106 but may not change the contents of the associated application data. Because the application data only changes after the primary data store 108 is updated (finalization phase), concurrent read operations from secondary data store 106 may not see dirty data as a result of the initialization phase.

If a new record is being pinned (e.g., an insert operation), a null data payload may be stored along with the metadata contents. If a concurrent application read returns a null data payload, the request may be redirected to primary data store 108 to service a related call.

There are several ways a pin may be removed, for example, when application's transaction completes or the pin is removed during the finalization phase. The pin may be also removed when a pin-specific TTL expires, forcing data to be removed from secondary data store 106. The pin may be also removed when a subsequent session updates the same record in the secondary store, thus breaking the prior pin and taking ownership of the record (e.g., a new pin is set).

In the event that secondary data store 106 is not available (e.g., network, data store outage), the initialization phase may be bypassed. For example, if an operation is an insert, no additional steps must be taken. The next read operation will repair secondary data store 106 to make it consistent with the primary. If the operation is an update or delete, the key for the record being modified may be written to a "Cache Failure Log" as part of the subsequent persistence phase transaction (see below). An asynchronous reconciliation job may use the failure log keys to remove stale records from secondary data store 106 when it becomes available.

During secondary data store initiation phase 502, an application-specified TTL may be set for the record that is to be changed (e.g., 20 seconds). If the put operation terminates without reaching the finalization phase, the data may be expired from secondary data store 106 and reloaded with the next data access. Failure to finalize may result from, for example, a hardware or network failure.

Second data store 110 may store metadata, which further includes a TTL, a CAS number, and a version number. For example, the metadata may include an application-managed optimistic lock version number. A record-level "cache lock version" may be written during secondary data store initiation phase 502 to support optimistic locking on secondary data store 106. A put operation may not finalize a record in the secondary store if the cache lock version changes between its initialization and finalization phases. A change to the cache lock version indicates that a subsequent session has taken ownership of the data in secondary data store 106. Because the first session no longer holds the pin on the data, a data management system may be turned over to the latter process (e.g., the current pin holder). This design (i.e., "breakable pin" design) enables high write concurrency within secondary data store 106 because sessions may not be blocked waiting to initialize data.

The metadata may include a data-store-managed CAS value. If secondary data store 106 supports conditional updates, the cache lock version may be sufficient to support the initialization phase's optimistic locking requirements. If secondary data store 106 does not support conditional updates, the data store's CAS functionality may suffice. In this instance, a record to be modified may be read with its CAS value from secondary data store 106, the metadata for the record including the TTL and cache Lock Version may be modified, and the record may be written back to secondary data store 106 via a CAS-aware put.

During primary data store persistence phase 504, the data being modified may be written and committed to the primary data store 108 as a single transaction. Unlike secondary data store 106, which accepts a single record/document per transaction, primary data store 108 may accept data in a variety of formats (e.g., normalized over multiple tables, key/value, etc.). In the event that the initialization phase failed to pin a record for update or delete in secondary data store 106 (for example, due to network or hardware outage), the key for this record may be written to the "Cache Failure Log" as a part of the persistence phase's transaction.

Writing to primary data store 108 may be dependent upon optimistic locking validation. For example, primary data store 108 includes a single "database lock version" that is associated with the data being modified. In a relational model, the database lock version may exist as a column in the top-level table for the object that is being persisted. When persisting data to the primary data store 108, the write may be successful if the database lock version being written matches the database lock version of the currently persisted object. As part of a successful object write, the database lock version may be modified to a new value (e.g., incremented or set to a unique value).

In the event that the transaction fails for any reason during the persistence phase, the transaction may be rolled back in primary data store 108. In these instances, a best-effort attempt may be made to delete the associated record from secondary data store 106, and an appropriate error message may be returned to the application. Causes for transaction failure may include catchable write errors (e.g., unique key violation, check constraint violations) and optimistic locking failures.

In the event that the application fails during the persistence phase (e.g., hardware issue), the record in the secondary data store 106 will not reach the finalization phase and will expire within its application-specified TTL time. TTL-based cleanup occurs whether or not there was a successful commit to the primary data store 108.

Secondary data store finalization phase 506 may be related to updating secondary data store 106 with application data and resetting the TTL metadata set during the initialization phase. Writing the application data brings secondary data store 106 to a consistent state with regard to primary data store 108. Resetting the TTL to a steady-state value (e.g., 1 day) ensures that secondary data store 106 may be able to respond to future read requests.

Finalizing secondary data store 106 may be dependent upon optimistic lock validation. For example, before the data can be finalized, an application may read the current state of the data from secondary data store 106, returning the record's current CAS value. The application may also compare the active cache lock version generated during the initialization phase to the version retrieved from the data store. If the active cache lock version matches the persisted version, the current session still owns the pin on secondary data store 106 and attempts a CAS-aware put of the modified record. In the event of an optimistic lock validation failure or a subsequent CAS put failure, the current session has lost its pin and will exit gracefully (no error, another session now owns the data in the secondary store). Otherwise, secondary data store 106 may be updated to be consistent with the primary data store 108.

In the event of any abnormal termination during the finalization flow, the TTL set during secondary data store 106 initialization phase 502 may remove the stale record from the secondary data store 106 so that it may be repaired when next accessed.

Figure 6:
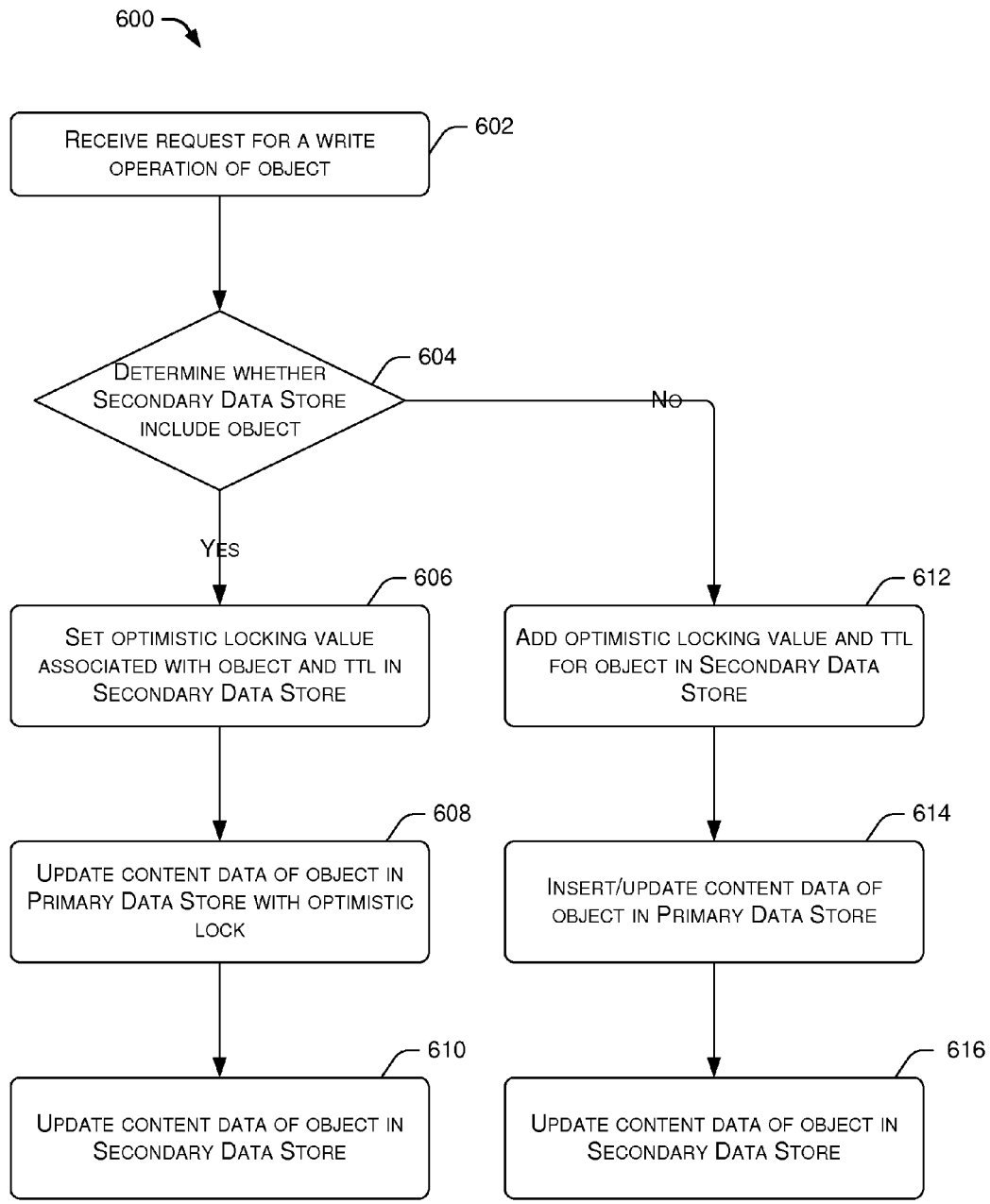
FIG. 6 is a flowchart diagram of an embodiment of a process for a put operation.

FIG. 6 is a flowchart diagram of another embodiment of a process for a put operation. Example process 600 includes one or more operations, actions, or functions. Although illustrated as discrete blocks, various blocks may be divided into additional blocks, combined into fewer blocks, or eliminated, depending on the desired implementation. Process 600 may be implemented by one or more processors including, for example, the computing device 200. For illustrative purposes, the operations described below are performed by one or more processors of one or more servers of service 102 as shown in FIG. 1 and/or the processor 204 of the computing device 200 as shown in FIG. 2.

At 602, one or more processors of one or more servers of service 102 may receive a request for a write operation of an object which is passed through to DAL 104. DAL 104 manages cache persistence associated with secondary data store 106 and primary data store 108.

At 604, DAL 104 may determine whether secondary data store 106 includes the object.

At 606, DAL 104 may set optimistic locking value associated with the object and TTL in secondary data store 106 in response to a determination that secondary data store 106 includes the object.

At 608, DAL 104 may update the object in primary data store 108 and its optimistic locking value.

At 610, DAL 104 may update content data of the object in secondary data store 106.

At 612, DAL 104 may add the optimistic locking value and TTL for the object in secondary data store 106 in response to a determination that secondary data store 106 does not include the object.

At 614, DAL 104 may then insert the content data of the object in primary data store 108 and set its optimistic locking value.

At 616, DAL 104 may update the content data of the object in secondary data store 106 and set associated metadata (e.g., TTL, CAS value, cache lock version).

Figure 7A:
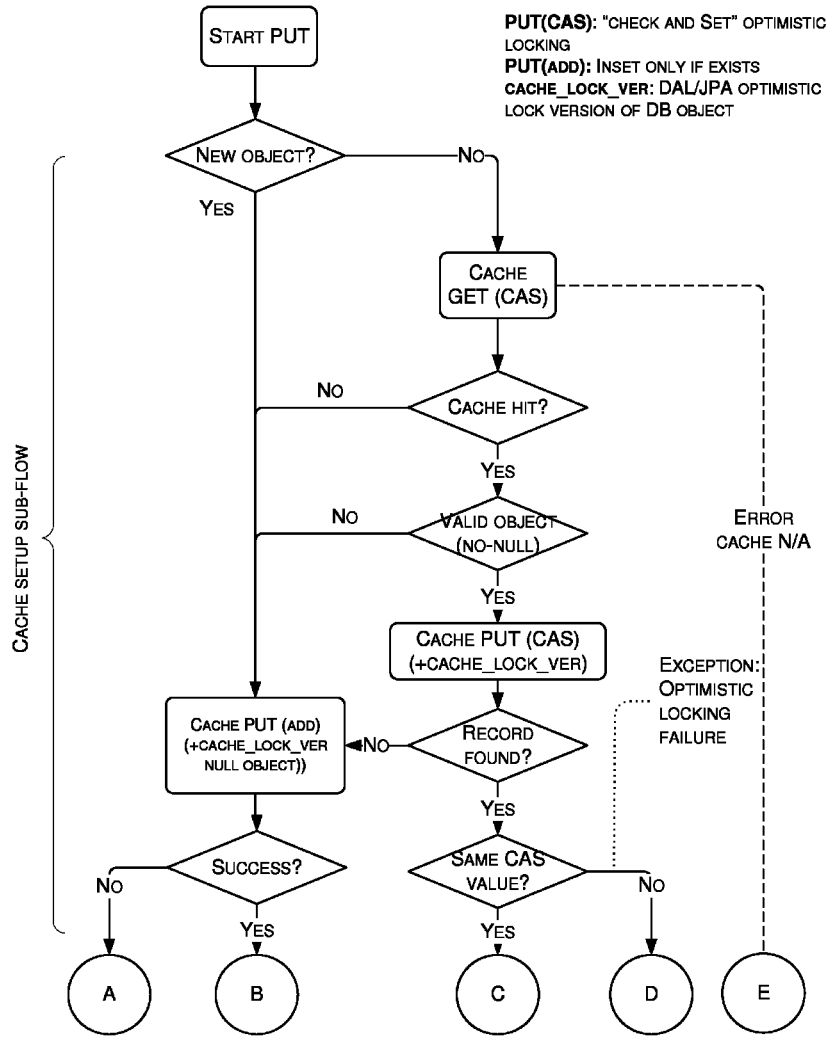
FIG. 7A and FIG. 7B are flowchart diagrams of an implementation of the embodiment of FIG. 6.
Figure 7B:
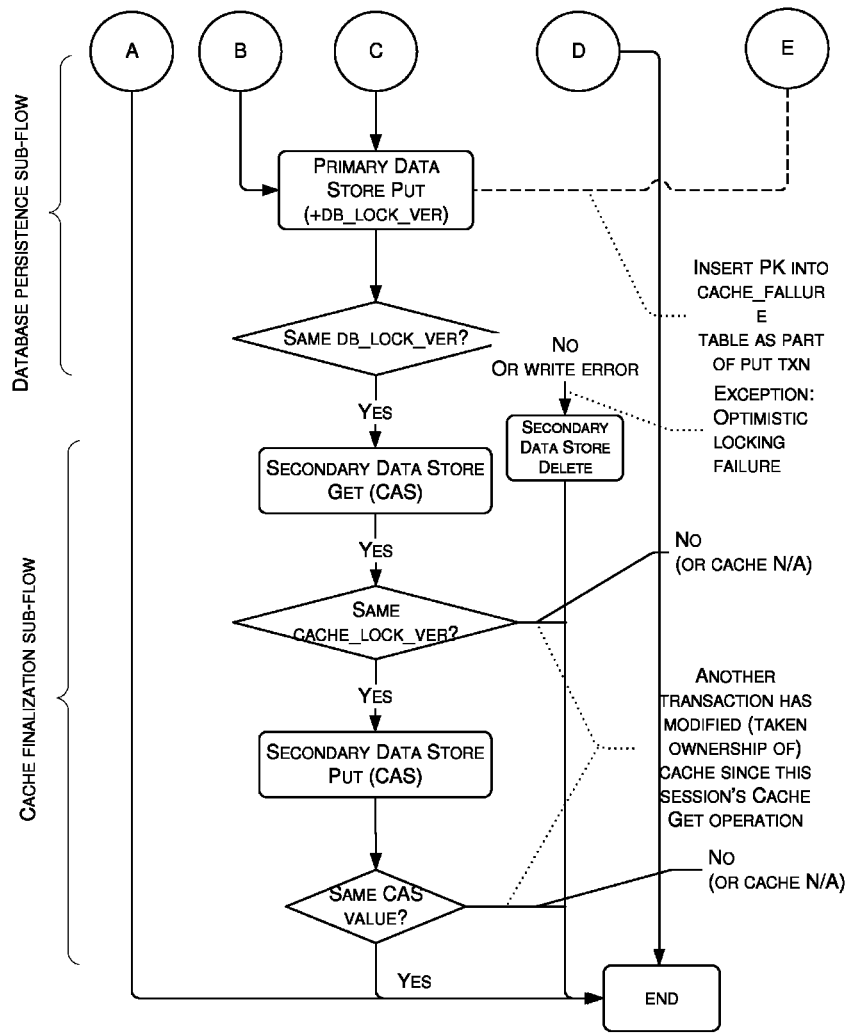

FIG. 7 is a flowchart diagram of an implementation of the embodiment of FIG. 6. As illustrated in FIG. 7, DAL 104 determines whether a new object is inserted or an existing object is updated. If the object does not exist in the secondary data store 106, an object with a null data payload and associated metadata is written to the secondary data store 106. If the object does exist in secondary data store 106, the metadata for this object must be initialized (i.e., the object must be "pinned" in the secondary data store 106). By setting the cache lock version and TTL for the object, this session has taken ownership of secondary data store 106.

During a "Primary Data Store put" operation, writes to the primary data store 108 modify the object's contents as well as its metadata (e.g., "database lock version"). This operation is successful only if the database lock version of the object has not changed. If the "put" fails (i.e., putting a stale object causes an optimistic lock check failure), DAL 104 invalidates secondary data store 106 with respect to the object. DAL 104 may leave secondary data store 106 to be repopulated by the next data access.

If the "Primary Data Store put" succeeds (i.e., the primary data store 108 was successfully modified), a "Secondary Data Store get" retrieves the secondary data store 106 object's current cache lock version and CAS value.

Subsequently, if another session has modified the secondary data store 106, the current session exits in response to the fact that the cache lock version has been changed (i.e., another session has taken ownership of the object) while leaving the cache lock version unchanged. If the cache lock version has not changed, a CAS-aware secondary data store write may update the object and reset the TTL. If the write fails to update the object in secondary data store 106 due to a CAS change, DAL 104 may allow the subsequent session to take ownership of secondary data store maintenance. If the write succeeds, DAL 104 may return a success message as appropriate to the service 102.

A failure to setup/initialize secondary data store 106 may not block primary data store 108 persistence. In some embodiments, allowing the primary data store 108 to be modified without modifying secondary data store 106 may lead to primary/secondary data store inconsistency with the secondary data store being left stale. When a new object is being inserted, the primary data store may be modified while bypassing the secondary data store 106 initialization and finalization phases. In these instances, read-repair will subsequently heal the secondary data store.

In some embodiments, DAL 104 may not reach secondary data store 106 during the secondary data store 106 initialization phase for update & delete operations (failed initialization on for insert operations does not require reconciliation). DAL 104 may continue on with the subsequent primary data store write operation. Under these conditions, updates/deletes by DAL 104 may bypass secondary data store 106 and modify primary data store 108 (e.g., leaving secondary data store 106 stale).

DAL 104 may not block writes as a result of situations in which the secondary data store is unavailable. These situations can result from a systemic secondary data store 106 issue as well as one-off connection issues impacting specific DAL 104 instances (e.g., configuration mistakes, network problems, etc.). Under such circumstances, objects in the primary data store 108 may be updated/deleted and remain stale in the secondary data store 106. This is a problem for write-once/read-many applications.

There may be a mechanism to cleanup (invalidate) stale objects from the secondary data store 106. DAL 104 may log the primary key (PK) for the object being updated into a "cache failure log". A background job may periodically consume these PKs to invalidate stale objects in secondary data store 106. There are a couple high-level alternatives for logging secondary data store 106 failures: logging the failure into the primary data store 108 as part of the object update/delete transaction and/or logging the failure into an external store (e.g., a queue or message service).

In some embodiments, when writing to primary data store 108, DAL 104 may add the failure logging into the same transaction as the object update/delete. For example, if the primary data store 108 is modified successfully, DAL 104 may log the failure as well. If, however, failure logs reside in an external queue, DAL 104 may not be able write to the external location. This failure may be due to a misconfiguration or a network issue. Persisting the failure log in the database may be recommended because DAL 104 logs the failure if the database object update/delete is successful. If the database update/delete fails, DAL 104 may not have to cleanup an external store/queue.

Figure 8:
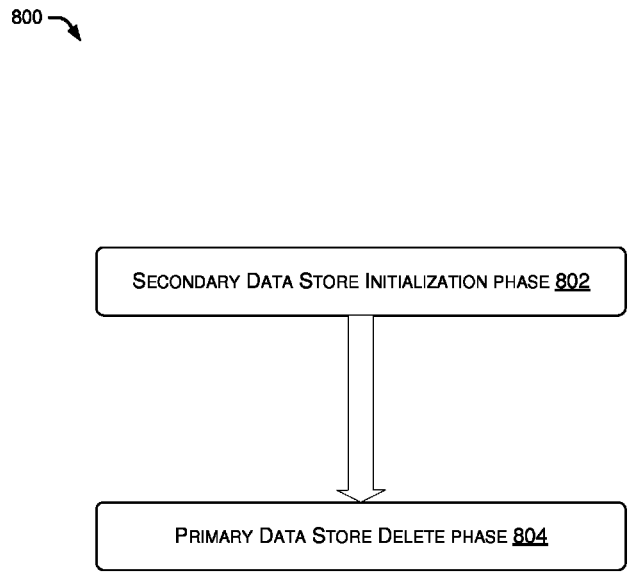
FIG. 8 is a flowchart diagram of a scheme for a delete operation.

FIG. 8 is a flowchart diagram of a scheme 800 for a delete operation. DAL 104 manages deleting data from the primary/secondary data stores 108 and 106. The delete operation may include the following two phases: a secondary data store initialization phase 802 and a primary data store delete phase 804. The delete operation may be optimized to remove data in as few operations as possible while mitigating race conditions that may leave primary and secondary stores 108 and 106 inconsistent. In some embodiments, secondary data store 106 initialization phase 802 may implement a "blind" TTL write with data payload being set to null. Primary data store delete phase 804 may be responsible for deleting data from primary data store 108 subject to optimistic lock check.

During the secondary data store 106 initialization phase 802, DAL 104 may set the cache lock version and TTL for the object being deleted. Updates to the secondary data store 106 may be "blind" such that there is no optimistic locking checking during write. Because there is no secondary data store 106 finalization phase for delete, this change may prevent prior active transactions from finalizing the secondary data store for the duration of this TTL. The DAL 104 may overwrite existing application data with a null payload which forces subsequent reader sessions to access primary data store 108, thus reducing the chance for concurrent readers to "see" the record that is being deleted. Because readers may not attempt to repair a record in secondary data store 106 that has a null payload, read/repair operations may not inadvertently repopulate deleted secondary store records.

The record being deleted may expire from secondary data store 106 within the specified TTL (e.g., 20 seconds). Until the TTL has expired, subsequent reads may bypass the secondary data store and will not attempt repair (repair is insert-only). Subsequent puts (updates) may be able to get a pin on secondary data store 106. The result of the update/delete race-condition depends upon the order in which the operations reach primary data store 108. Specifically, the first operation to successfully update primary data store 108 dictates the source-of-truth and the other operation will (correctly) fail due to an optimistic lock failure.

During primary data store 108 delete phase 804, the object in question may be deleted using the same optimistic locking protocol defined for the put operation. Supposing that the database lock version provided by the application matches the version of the persisted object, the deletion will succeed. Upon successful delete from primary data store 108, the data may be no longer available in either the primary or secondary data stores 108, 106. Upon TTL timeout, the null object may expire and be removed from secondary data store 106 without need for an additional finalization phase.

Figure 9:
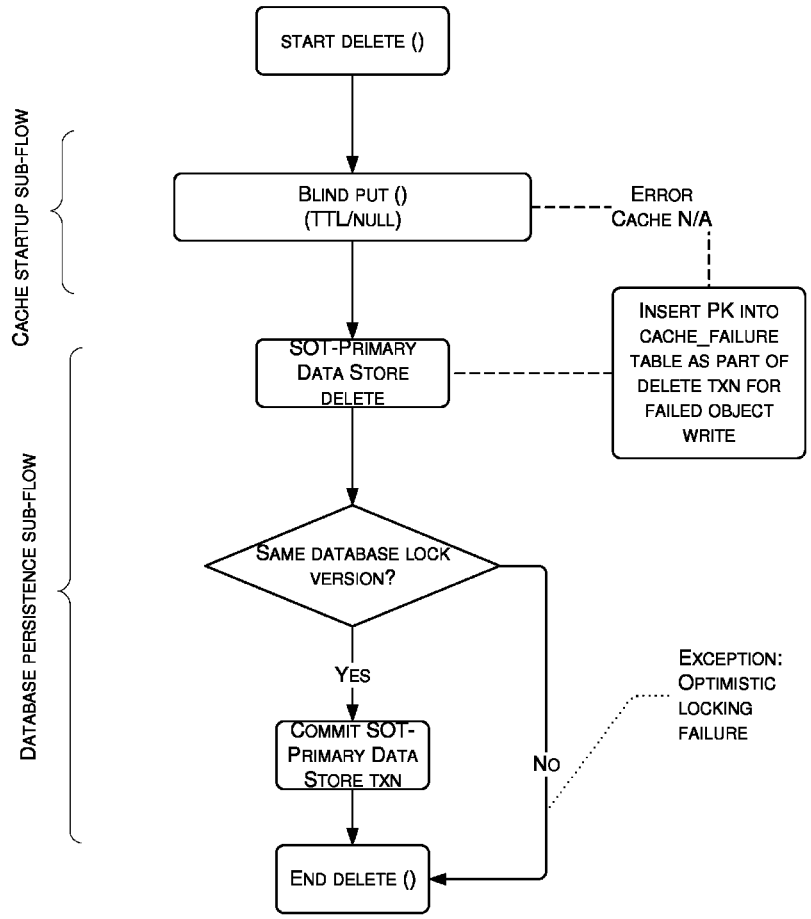
FIG. 9 is a flowchart diagram of an implementation of the scheme of FIG. 8.

FIG. 9 is a flowchart diagram of an implementation of the scheme of FIG. 8. As illustrated in FIG. 9, secondary data store 106 may be initialized with a DAL standard TTL (e.g., 20 sec) and the current object (if in secondary data store 106) may be overwritten with a null value. Secondary data store 106 initialization may be blind (not CAS & no cache lock ver check), wherein there is no cache finalization phase (unlike the put flow), and the object in secondary data store 106 will expire based on the transaction TTL. Read operations from other session(s) will receive a null payload from the secondary data store 106, and as a result, proceed reading the object from the primary data store without attempting to repair the secondary data store. The TTL window may mitigate race conditions caused when a reader session is attempting to repair the secondary data store 106. Specifically, the TTL provides a buffer against unwanted read-repair from prior sessions.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   receiving, by one or more processors of one or more servers associated with a data access logic (DAL) library, a request for a put operation of an object, the DAL library managing persistence of a secondary data store associated with a primary data store;
   determining whether the secondary data store includes the object; and
   in response to a determination that the secondary data store includes the object:
      setting a cache optimistic locking value in metadata of the object, the cache optimistic locking value representing a first unique identifier generated for the object to manage optimistic locking at the secondary data store;
      updating the object in the primary data store with the cache optimistic locking value; and
      updating content data of the object in the secondary data store in response to a determination that the cache optimistic locking value has not been changed;
   setting a check and set (CAS) value for the object;
   setting a time-to-live (TTL) for the object;
   setting a database optimistic locking value representing a second unique identifier generated for the object to manage optimistic locking at the primary data store;
   updating the metadata in the primary data store, the metadata including the database optimistic locking value;
   determining whether the database optimistic locking value has been changed; and
   in response to a determination that the database optimistic locking value has not been changed, determining whether the CAS value has not been changed during the TTL.

2. The method of claim 1, further comprising:
   in response to a determination that the secondary data store does not include the object:
      updating the content data of the object in the secondary data store; and
      inserting the content data of the object in the primary data store.

3. The method of claim 1, further comprising storing the object in the primary data store in response to a determination that the CAS value has not been changed.

4. The method of claim 1, wherein updating the content data of the object in the secondary data store comprises updating the content data of the object in the secondary data store in response to the determination that the CAS value has not been changed during the TTL.

5. The method of claim 1, wherein the secondary data store is an external cache that is physically separate from the primary data store.

6. A method comprising:
   receiving, by one or more processors of one or more servers in a data access logic (DAL) framework, a request for a get operation of an object wherein the DAL framework manages cache persistence associated with a cache and a database, and wherein the cache is a level 2 (L2);
   determining whether the cache, that is associated with the database, includes the object; and
   in response to a determination that the cache does not include the object:
      retrieving content data of the object from the database;
      writing the content data of the object to the cache, wherein writing the content data of the object to the cache comprises:
         setting a cache optimistic locking value for the object, the cache optimistic locking value representing a unique identifier generated for the object to manage optimistic locking at the cache;
         retrieving a current cache optimistic locking value associated with the object;
         determining whether the cache optimistic locking value has not been changed based on the current cache optimistic locking value; and
         in response to a determination that the cache optimistic locking value has not been changed, writing the content data of the object to the cache; and
      returning the content data of the object.

7. The method of claim 6, wherein the cache is an external cache that is physically separate from the database.

8. The method of claim 6, further comprising, in response to a determination that the cache includes the object, returning the content data of the object.

9. An apparatus comprising:
   a memory configured to store data and one or more sets of instructions; and
   one or more processors coupled to the memory, the one or more processors configured to execute the one or more sets of instructions and perform operations comprising:
      receiving a request for a write operation of an object;
      determining whether a secondary data store associated with a database includes the object;
      in response to a determination that the secondary data store includes the object:
         setting a cache optimistic locking value associated with the object in metadata of the object in the secondary data store, the cache optimistic locking value representing a unique identifier generated for the object to manage optimistic locking at the secondary data store;
         updating the object in the database with the cache optimistic locking value; and
         updating content data of the object in the secondary data store in response to a determination that the cache optimistic locking value has not been changed;
      setting a check and set (CAS) value for the object;
      setting a time-to-live (TTL) for the object, wherein the metadata includes the cache optimistic locking value and the TTL;

setting a database optimistic locking value representing a second unique identifier generated for the object to manage optimistic locking at the database;

writing the metadata in the database, the metadata including the database optimistic locking value;

determining whether the database optimistic locking value has been changed; and in response to a determination that the database optimistic locking value has not been changed, determining whether the CAS value has not been changed during the TTL.

10. The apparatus of claim 9, wherein the apparatus comprises a data access layer (DAL) that manages cache persistence associated with the secondary data store and the database.

11. The apparatus of claim 9, wherein the operations further comprise:

in response to a determination that the secondary data store does not include the object:
updating the content data of the object in the secondary data store; and
updating the content data of the object in the database.

12. The apparatus of claim 9 wherein the operations further comprise storing the object in the database in response to a determination that the CAS value has not been changed.

13. The apparatus of claim 9 wherein the updating the content data of the object in the secondary data store comprises updating the content data of the object in the secondary data store in response to the determination that the CAS value has not been changed during the TTL.

14. The apparatus of claim 9, wherein the secondary data store is an external cache that is physically separate from the database.

* * * * *